United States Patent
Kroll et al.

(10) Patent No.: US 6,775,301 B1
(45) Date of Patent: Aug. 10, 2004

(54) SYSTEM AND METHOD FOR COMPENSATING FOR CHANNEL JITTER

(75) Inventors: James M. Kroll, Prospect Heights, IL (US); Leland O. Thompson, Carpentersville, IL (US); Chris Rozman, Kildeer, IL (US); Thomas A. Gentles, Rolling Meadows, IL (US)

(73) Assignee: 3Com Corporation, Marlborough, MA (US)

( * ) Notice: Subject to any disclaimer, the term of this patent is extended or adjusted under 35 U.S.C. 154(b) by 0 days.

(21) Appl. No.: 09/520,931

(22) Filed: Mar. 8, 2000

(51) Int. Cl.[7] ................................................. H04J 3/06
(52) U.S. Cl. ........................................ 370/516; 370/412
(58) Field of Search ................................. 370/516, 517, 370/518, 412, 508; 375/371, 372

(56) References Cited

U.S. PATENT DOCUMENTS

| | | | | |
|---|---|---|---|---|
| 3,829,843 A | * | 8/1974 | Cichetti et al. | 370/517 |
| 4,538,259 A | * | 8/1985 | Moore | 370/519 |
| 5,534,937 A | * | 7/1996 | Zhu et al. | 370/506 |
| 5,623,483 A | * | 4/1997 | Agrawal et al. | 370/519 |
| 5,640,388 A | * | 6/1997 | Woodhead et al. | 370/516 |
| 5,805,602 A | * | 9/1998 | Cloutier et al. | 370/516 |
| 6,389,032 B1 | * | 5/2002 | Cohen | 370/516 |

OTHER PUBLICATIONS

Schulzrinne/Casner/Frederick/Jacobson, *RTP: A Transport Protocol For Real–Time Applications, Internet Engineering Task Force Memo*, Oct. 21, 1999, pp. 1–100.

* cited by examiner

Primary Examiner—Chi Pham
Assistant Examiner—Keith M. George
(74) Attorney, Agent, or Firm—McDonnell Boehnen Hulbert & Berghoff LLP (57) ABSTRACT

A system and method for receiving a transported stream of data packets at a network includes stripping the headers off the data packets at a de-packetizer, buffering the data packets at a jitter buffer and shifting the play-out of the data packets from the jitter buffer to a decoder by at least a fraction of a frame to provide a desired value of channel jitter compensation. The shift in the play-out of the data packets is computed either using a watermark optimization calculation, a frame phase offset adjustment which reduces the delay between packet arrival times and packet depletion times, or a combination of the two.

8 Claims, 11 Drawing Sheets

SYSTEM AND METHOD FOR COMPENSATING FOR CHANNEL JITTER

FIELD OF THE INVENTION

This present invention relates to a system and method for providing real-time data communications over packet switched networks. In particular, it relates to a system and method for compensating for channel jitter to provide a synchronous play-out of data packets.

BACKGROUND OF THE INVENTION

Real time communications such as audio or video can be encoded using various compression techniques. One or more frames of encoded information can then be placed in a data packet with time and sequence information and transported via non-guaranteed Quality of to Service (QoS) packet networks. A stream of such packets may be used to transfer real time audio or video information. Non-guaranteed packet switched networks include a Local Area Network (LAN), Internet Protocol Network, Frame Relay Network, or an interconnected mixture of such networks such as an Internet or Intranet. One underlying problem with non-guaranteed packet networks is that transported packets are subject to varying loss and delays. Therefore, for real-time communications, a tradeoff exists among the quality of the service, the interactive delay, and the utilized bandwidth. This tradeoff is a function of the selected coding scheme, the packetization scheme, the redundancy of information packeted within the packets, the receiver buffer size, the bandwidth restrictions, and the transporting characteristics of the transporting network.

The transmission of real time communications over packet switched networks presents several challenges. One such problem is how to maintain a synchronous play-out of frames to the decoder, given that the packet arrival times are non-deterministic. The uncertainty in the arrival time of any packet in a packet stream is referred to as jitter. Typically, this problem is addressed using a jitter buffer. The jitter buffer waits for the reception of some number of frames before play-out begins. The threshold number of frames in the buffer during transmission is typically known as a watermark. In this way, if subsequent packets are slightly early or slightly late, they are still likely to arrive in time for their scheduled play-out.

The workings of the jitter buffer itself present different challenges. For example, if the buffer is made very large, the inherent delay of the jitter buffer may exceed the channel jitter, and the system receives all packets in time for their respective play-out. The disadvantage of having a very large buffer is that a large delay is added to the system. This may be unacceptable in a real time voice or video session. Conversely, if the buffer is made very small, there will be an excessive number of late packets which cannot be played on time. This will degrade the quality of the reconstructed signal. Thus, there is a trade-off between the buffer size and the quality of the reconstructed signal.

High quality switched networks are currently being designed to provide jitter within a certain range, such as, for example, ±40 ms. Theoretically, the buffer can be set to provide the precise amount of jitter compensation required, without introducing additional delay. However, locking on to a precise amount of jitter compensation is challenging. There is, therefore, still a need for providing a specified amount of jitter compensation without overcompensation or sacrificing the quality of the reconstructed signals.

SUMMARY OF THE INVENTION

In accordance with preferred embodiments of the present invention, some of the problems associated with transmission of real time data over packet switched networks are overcome. The present invention includes a system and method for a jitter buffer to maintain a specified value of jitter compensation. The method of the present invention includes receiving data packets at a network, followed by the header of the data packets being stripped off at a de-packetizer. The payload output from the de-packetizer includes one or more frames and a sequence number. The method also comprises buffering the data frames at a jitter buffer and shifting the play-out of the data packets from the jitter buffer to a decoder by at least a fraction of a frame to reduce delay between arrival times of the data packets and play-out time of the data packets.

In a particular embodiment the shift in the play-out of the data packets is calculated using a watermark value which represents the average number of frames in the buffer during steady state frame transmission. A first clock that defines the arrival sampling times runs at a rate faster than a second clock that defines the frame depletion times.

In another preferred embodiment the shift in the play-out of the data packets addresses a frame phase offset which occurs when the packet arrival intervals are out of phase with packet depletion times. The calculation of the shift provides an average sub-frame offset between arrival and depletion times.

In further embodiments of the present invention the calculation of the shift in the play-out of the data packets is implemented by first calculating the shift to address the frame phase offset and then calculating the watermark optimization or alternatively implementing a combined shift calculated by summing the shifts due to the frame phase offset and watermark optimization.

The present invention also provides a communication system receiver for receiving a transported stream of data packets over a packet switched channel through a LAN. The receiver includes a de-packetizer which receives the packets received off the LAN and strips off the header of each packet. The receiver further includes a jitter buffer that receives the payload, which includes one or more frames and a sequence number. The jitter buffer stores the frames according to arrival times and plays out the frames in an order defined by the sequence numbers. A controller for the jitter buffer controls the order and timing of the play-out of the data frames. The receiver includes a decoder which receives frames output from the jitter buffer at regular intervals. The decoder reconstructs the original signal. In a preferred embodiment, the receiver of the present invention includes a first clock having a first rate that defines arrival sampling times which runs at a rate faster than a second clock having a second rate that defines frame depletion times.

The foregoing features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

BRIEF DESCRIPTION OF THE DRAWINGS

Preferred embodiments of the present invention are described with reference to the following drawings, wherein.

DETAILED DESCRIPTION OF PREFERRED EMBODIMENTS

The present invention is directed towards a system and a method for compensating for channel jitter and allows a jitter buffer to maintain a specified jitter compensation.

Figure 1:
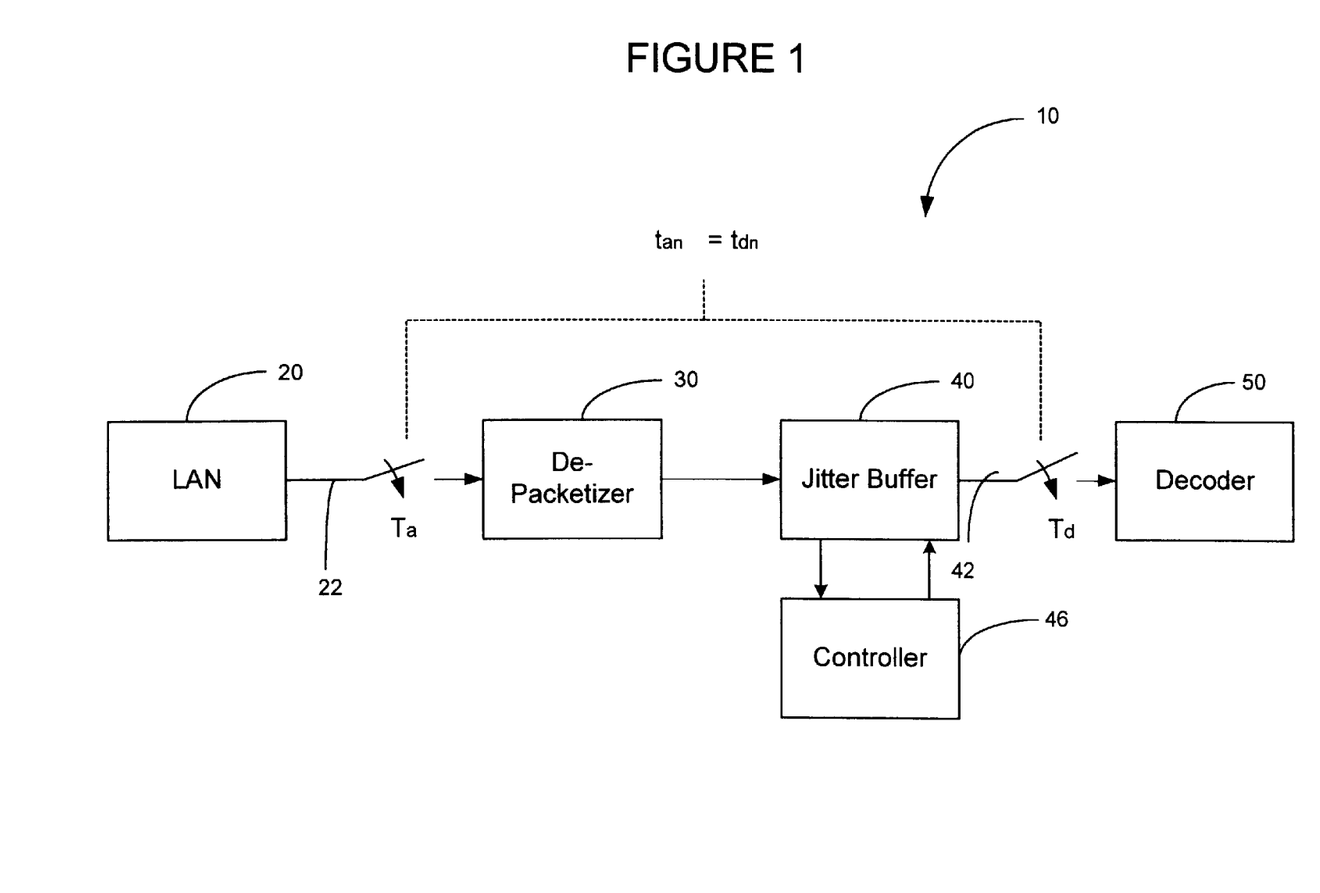
FIG. 1 is a block diagram illustrating an example of a conventional receiver system that includes a conventional jitter buffer.

FIG. 1 is a simplified block diagram showing an example of a communication system receiver 10 for receiving data packet over a packet switched channel through local area network (LAN) 20. In the system of FIG. 1, the LAN 20 introduces channel jitter, where packets are delayed and may be received out of order. Packets are received off the LAN 20 and handed to de-packetizer 30 via circuit node 22. A header is stripped off of each packet by the de-packetizer 30, and the payload which is output from the de-packetizer includes one or more frames and a sequence number, which are stored in jitter buffer 40 defined by sequence numbers. The frame from late arriving packets can be input into the buffer in the order given by their respective sequences numbers provided that arrive before their respective play-out time. An example of a protocol that includes sequence numbers for purposes of reconstructing data in real-time order is the Real Time Protocol (RTP). Further information regarding the RTP is available from the Internet Engineering Task Force site at www.ietf.org.

The size of the jitter buffer 40 is typically expressed as an integer number of frames. Jitter buffer 40 dequeues a frame from jitter buffer 40 at a regular frame interval $T_d$ and in a sequence defined by a controller 46 and outputs it at a circuit node 42 for input to decoder 50 in the order given by their respective sequence numbers. The decoder 50 decodes the frames in order to reconstruct the original signal that was encoded and packetized by an entity at the other end of a connection through LAN 20. In this particular implementation, the arrival time ($t_n$) of the nth packet at circuit node 22, where the system pulls frames into jitter buffer 40, is a continuous random variable. The delay through the de-packetizer 30 is assumed to be negligible. The time ($td_n$) when frames are depleted from jitter buffer 40 is discrete and uniform.

In a particular embodiment in accordance with the present invention, the sampling times where the system is looking for arriving packets ($ta_n$), such as at circuit node 22, and depleting frames ($td_n$) such as at circuit node 42, are synchronized. The integer compensation is based on an integer multiple of the frame duration ($T_d$) However, an integer number of frames provide a jitter compensation which may not exactly match the desired compensation. Additional overcompensation may result if the nominal frame arrival times do not match the frame depletion times at the output of the buffer.

It will be appreciated that the input and output media may engage in interactive communication. In that case, for instance, the transmitter or sender would also perform the functions of a receiver, such as receiver 10, and receiver 10 would also perform the functions of a transmitter. Further, the principles described herein could be applied in either or both directions, such as for an interactive telephone conversation.

Figure 2:
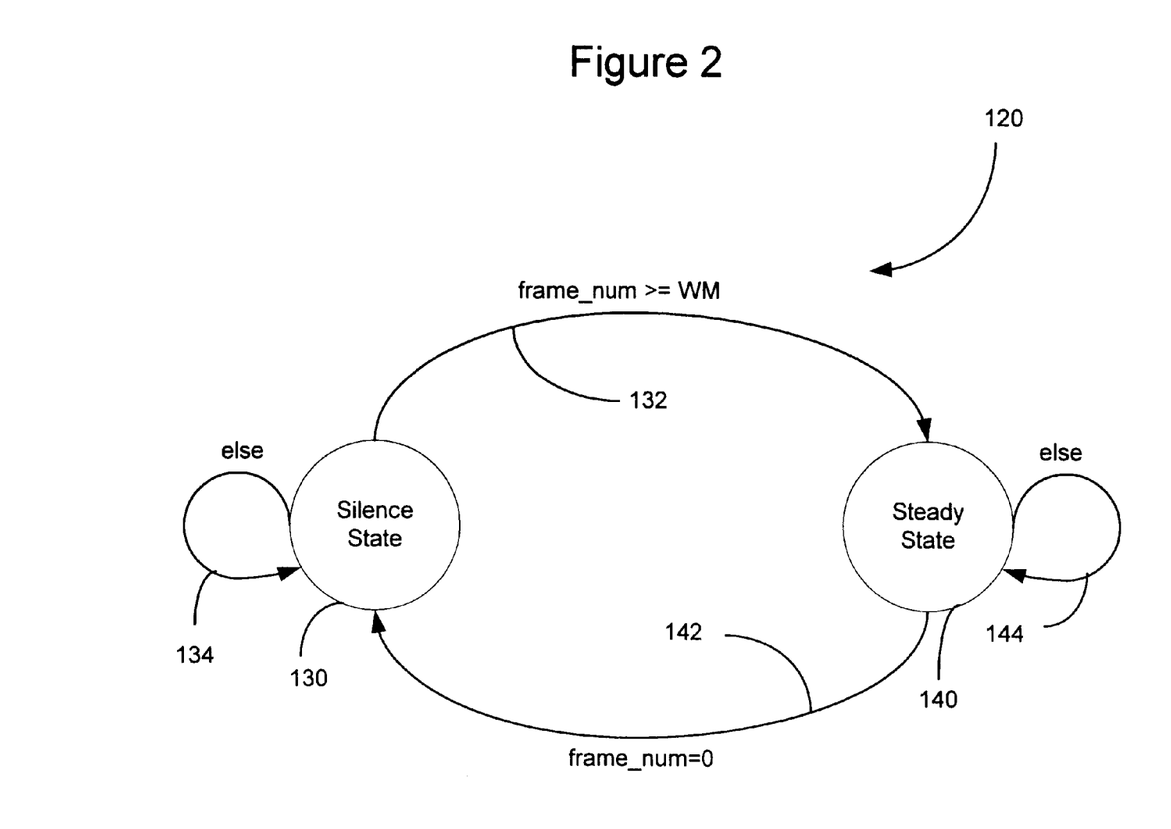
FIG. 2 is a state diagram illustrating an exemplary frame output control machine.

FIG. 2 is a state diagram illustrating an example of a frame output control machine or state machine 120. The frame output control machine executes within the controller 46. Frame output control machine 120 has a silence state 130 during which no frames are output from jitter buffer 40 to decoder 50. If, as frames are received from de-packetizer 30, the number of frames (frame_num) in jitter buffer 40 reaches or exceeds a threshold or watermark value WM, then state machine 120 traverses edge 132 to steady state 140. If frame_num remains less then WM, then edge 134 is traversed and state machine 120 remains in silence state 130.

When state machine 120 is in steady state 140, controller 46 drives buffer 40 to output a frame to decoder 50 at every frame interval $T_d$. While there are frames in jitter buffer 40, state machine 120 will traverse edge 144 and remain in steady state 140. However, if the incoming frame rate does not keep pace with the frame interval $T_d$, then frame_num will eventually decrement to zero and state machine 120 will traverse edge 142 back to silence state 130 to await additional frames.

The watermark WM value ideally corresponds to the average number of frames in the jitter buffer during steady state operation. The number of frames in a buffer will fluctuate between 0 and 2*WM, inclusively. This range is introduced to compensate for channel jitter. The system includes, but is not limited to, 1 frame per packet.

Figures 3A, 3B:
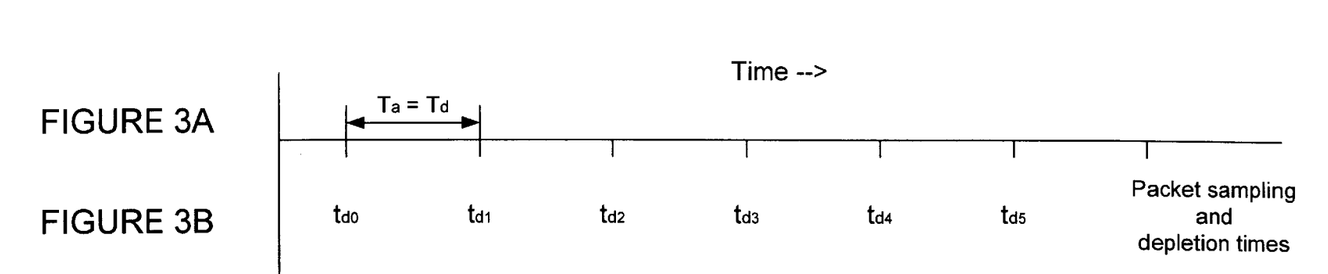
FIGS. 3A–3F are timing diagrams illustrating an exemplary integer based jitter compensation system.
Figure 3C:
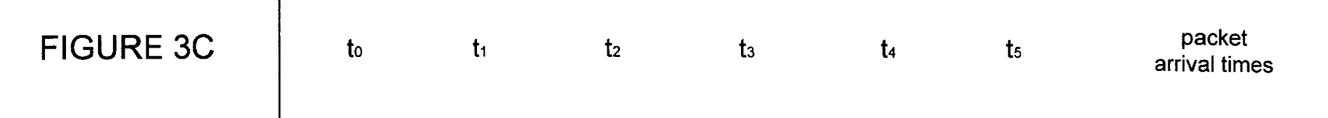
Figure 3D:
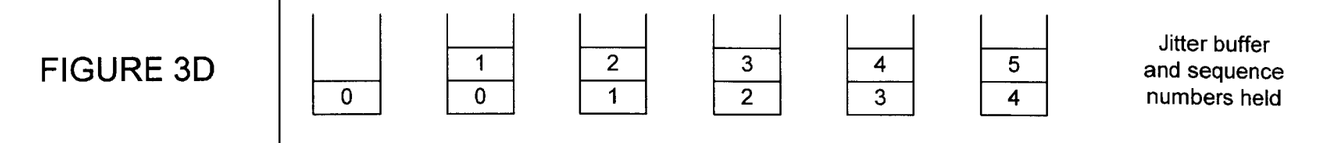
Figure 3E:
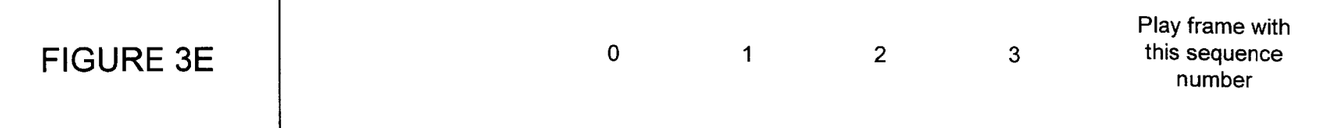
Figure 3F:
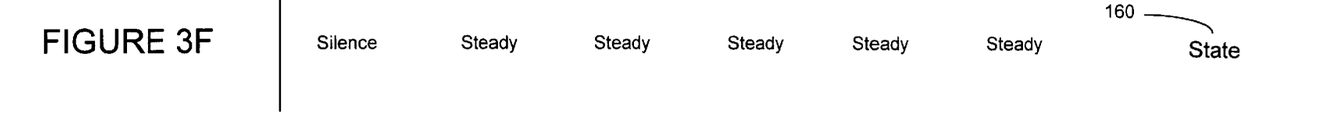

FIGS. 3A–3F are timing diagrams illustrating a system where for example, 40 milliseconds (ms) of jitter compensation is desired. Jitter compensation is the average amount of time a frame is held in the jitter buffer prior to depletion. Using a frame duration or interval $T_d$ value of 30 ms, the minimum value for WM that provides 40 ms of jitter compensation is 2 frames. Only in FIGS. 3A–3F, it is assumed that the channel jitter is zero and $t_n = ta_n = td_n$. The state 160 in FIG. 3F represents the decoder state at the end of the most recent depletion time, $td_n$. The drawback of using integer frame compensation is that it may yield more compensation than desired. A WM of two, for instance, yields 60 ms of delay in the example as $T_d$=30 ms. Therefore, the system has added 20 ms of additional delay. This delay is undesirable in a real time session.

Figure 4:
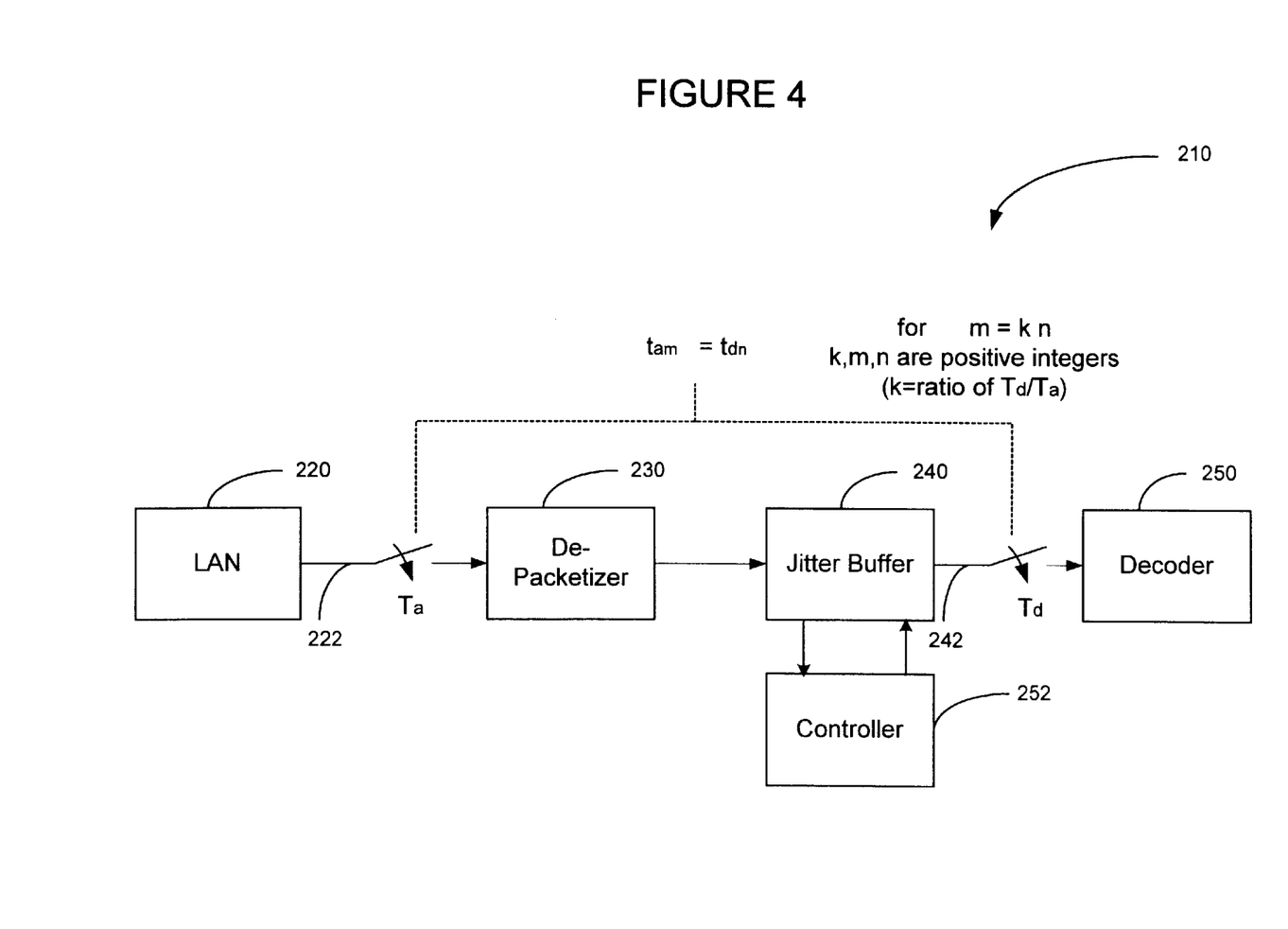
FIG. 4 is a block diagram illustrating a preferred embodiment of a communication system in accordance with the present invention.

FIG. 4 is a block diagram illustrating a preferred embodiment of a system which compensates for channel jitter in accordance with the present invention. The system architecture is similar to the system illustrated with respect to FIG. 1. The communication system receiver 210 receives data packets over a packet switched channel through LAN 220. The LAN 220 introduces channel jitter and hands the packets to de-packetizer 230 via circuit node 222. The jitter buffer 240 stores the data packets. The frames are dequeued from jitter buffer 240 at a regular frame rate interval $T_d$ defined by the controller 252 and are output at circuit node 242 to decoder 250.

The system of the present invention includes as part of the controller 252, a first clock having a first rate that defines the arrival sampling times. The system also includes a second clock having a second rate that defines the frame depletion times. The first rate is k times faster than the second rate ($T_d = k * T_a$) Furthermore, in the preferred embodiment, every k arrival sampling time is exactly equal to a frame depletion time. Hence, in this embodiment, the phase of the arrival and depletion sampling times are identical. The time $T_a$ defines a "sub-frame interval."

Figure 5A:
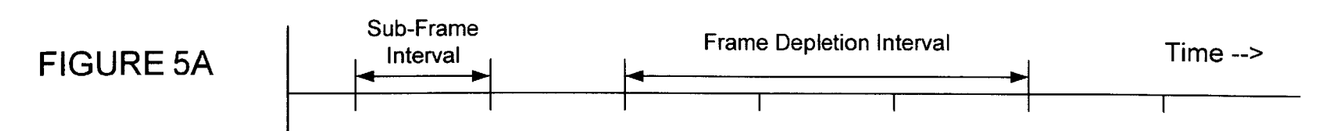
FIGS. 5A–5C are timing diagrams illustrating the alignment of sub-frame and frame sampling times.
Figure 5B:
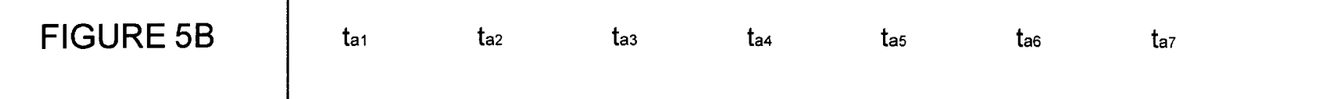
Figure 5C:
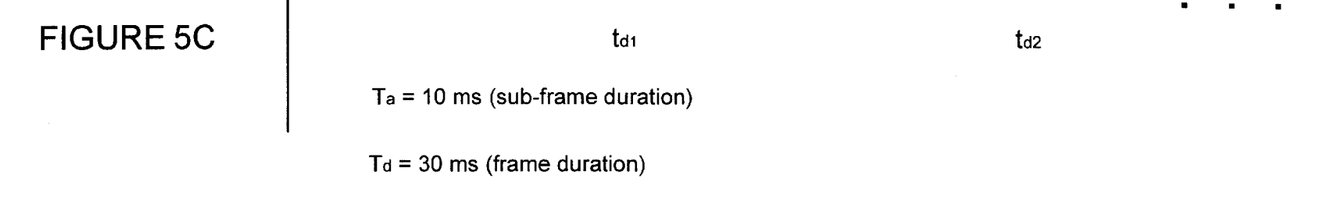
Figure 6A:
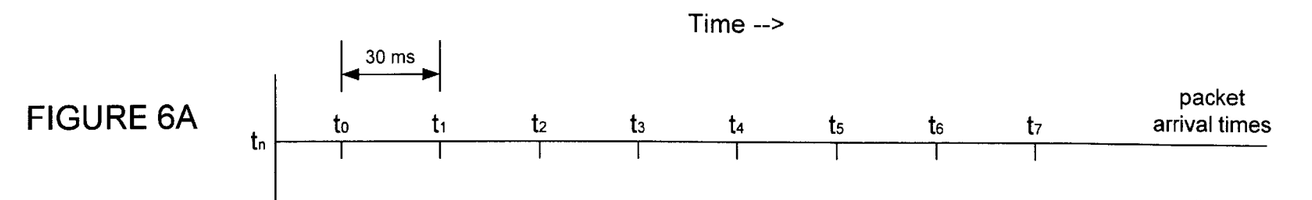
FIGS. 6A–6E are timing diagrams illustrating a control to optimize the system delay in accordance with a preferred embodiment of the present invention.
Figures 6B, 6C:
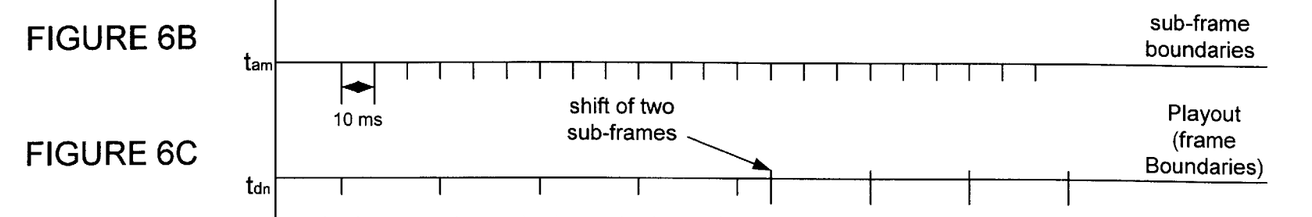
Figure 6D:
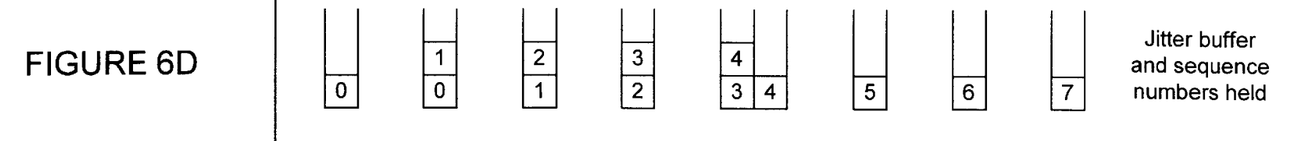
Figure 6E:
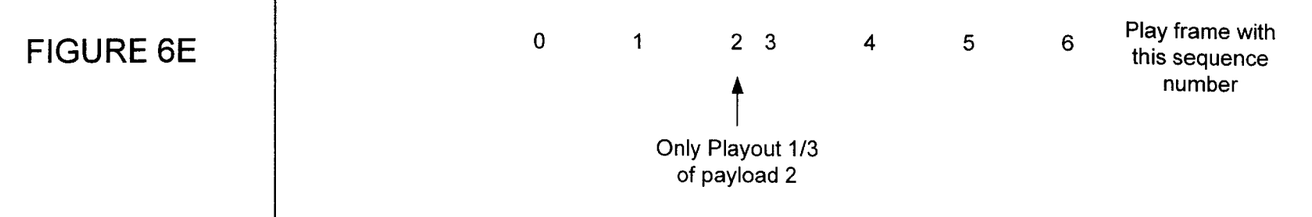
Figure 7A:
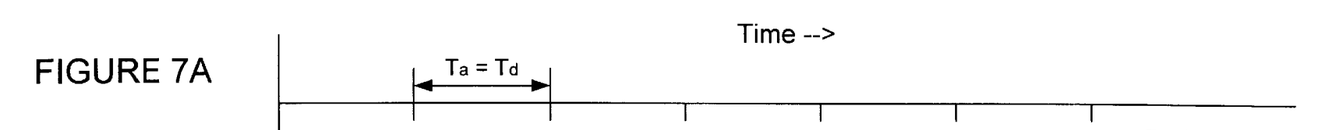
FIGS. 7A–7E are timing diagrams illustrating a frame phase offset in accordance with a preferred embodiment of the present invention.
Figure 7B:
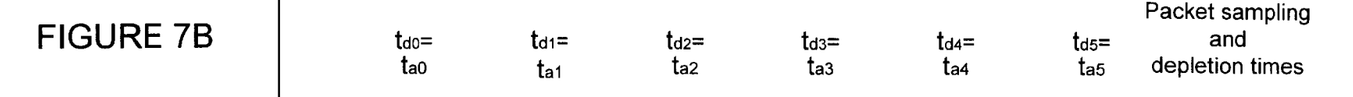
Figure 7C:
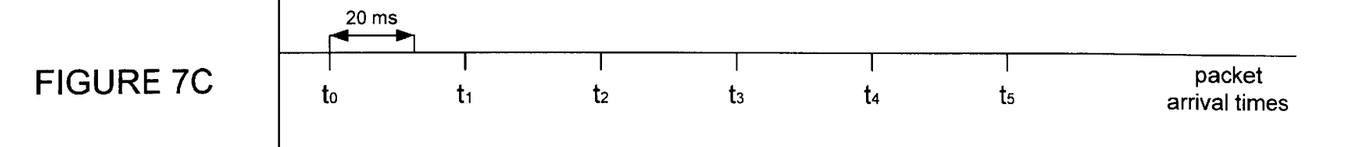
Figure 7D:
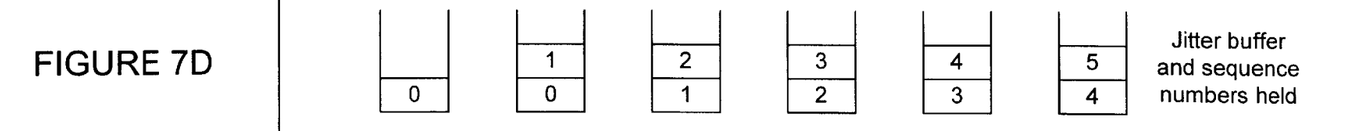
Figure 7E:
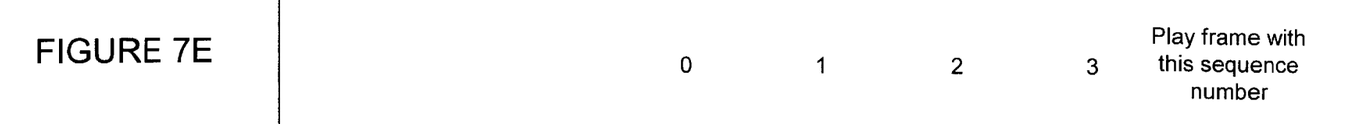
Figure 8A:
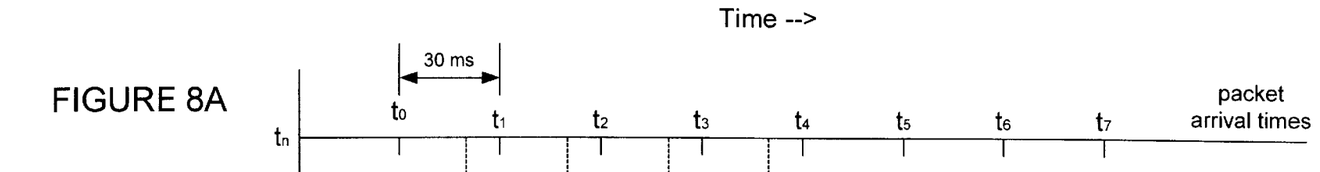
FIGS. 8A–8E are timing diagrams illustrating a correction for a non-zero frame phase offset in accordance with a preferred embodiment of the present invention.
Figure 8B:
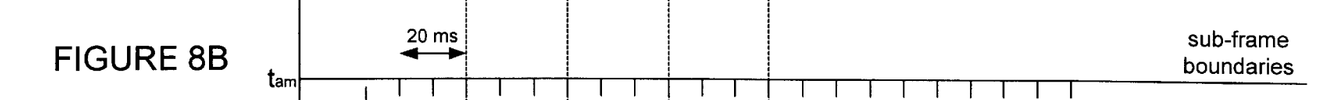
Figure 8C:
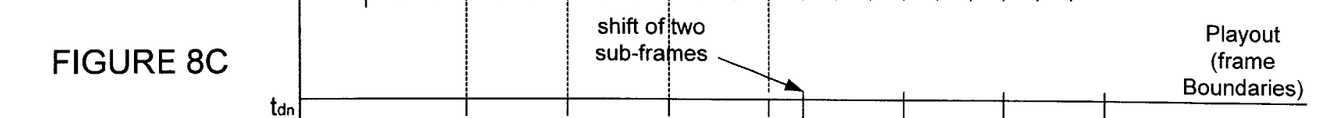
Figure 8D:
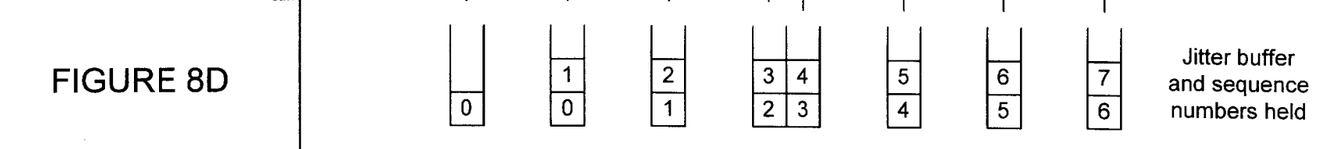
Figure 8E:
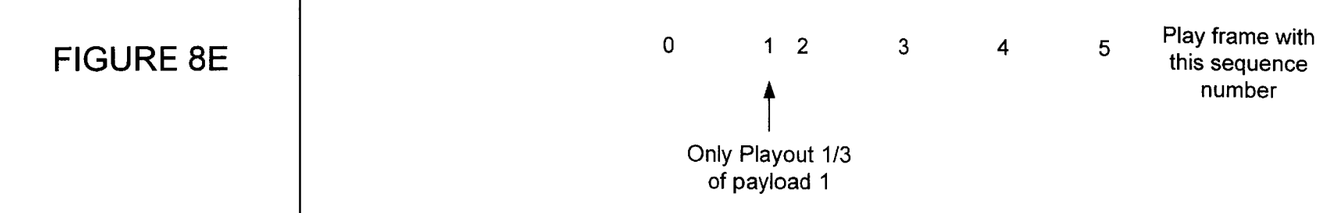

FIGS. 5A–5C are timing diagrams illustrating the alignment of the sub-frame and frame- sampling times as discussed with respect to the system illustrated in FIG. 4.

Overcompensation in the jitter buffer is reduced or preferably eliminated by shifting the depletion interval by one or more sub-frame intervals relative to the arrival time interval of the packets. Specifically, some fraction of a frame is eliminated at the decoder 250 and the next frame begins play-out sooner by one or more sub-frame intervals. This is achieved by adjusting the sample times for depleting packets ($td_n$) with a resolution equal to the sub-frame rate. Thus, the larger the value of k is, the greater the control to optimize the delay. The number of sub-frame shifts can be determined by the following equation:

Sub-frame correction=⌊[desired compensation−
(WM×$T_d$)] ÷$T_a$⌋    Equation 1 where $T_d$ is the frame duration and "⌊ ⌋" indicates the round-down operation. A negative result means the depletion times are too late and they need to be advanced to compensate. A positive result means that the depletion times are too early and that they need to be delayed.

FIGS. 6A–6E are timing diagrams illustrating an example of a system using sub-frame intervals to optimize the jitter compensation with respect to the system delay. In the example, each packet contains one frame of data and 40 ms of jitter compensation is desired. Using a sub-frame duration of 10 ms, a frame duration $T_d$ of 30 ms, the minimum value for WM that provides 40 ms of jitter compensation is 2 frames based on an integer frame compensation method while an optimal non-integer value for WM that provides 40 ms of jitter compensation is 1⅓. It should be noted that the Sub-frame correction=⌊[40−(2×30)]÷10 ⌋=−2

The delay or compensation is 40 ms for all frames $F_n$, where n≧3. This is achieved by only playing out ⅓ of the frame $F_2$, and shifting all subsequent play-out times by exactly 20 ms, or two sub-frame intervals.

Further, if the jitter buffer drains because packets stop arriving, then the process needs to be re-executed with each new burst of data packets that causes the system to leave the silence state. Thus, for voice transmission with silence suppression, the watermark optimization process has to be executed every time steady state is entered.

In another preferred embodiment of the system and method of the present invention, the packet arrival times $t_n$ do not align with the depletion sampling time $td_n$, which leads to additional system delay. It is assumed, for the example, that there is one frame per packet. FIGS. 7A–7E are timing diagrams illustrating the frame phase offset which results when the actual packet arrival intervals are out of phase with the packet sampling and depletion times. As an example, the system depicted is one where a 60 ms jitter compensation is desired. Further the packet sampling duration and the depletion times are equal to one another and 30 ms. However, the $t_n \neq td_n$. The packet flow into and out of the jitter buffer is illustrated in FIGS. 7A–7E. Due to sampling at $t_{an}$, and the state transitions at times $td_n$, 20 ms of over-compensation, or a total system delay of 80 ms, results.

The frame phase offset can be corrected using the sub-frame sampling method discussed with respect to FIGS. 5A–5C. A frame phase offset correction can be defined as $$\text{Frame phase offset correction} = \left\lfloor \frac{1}{N \cdot T_a} \cdot \sum_{n=0}^{N-1} (ts_n - td_n) \right\rfloor \quad \text{Equation 2}$$

in number of sub-frames. Here, $ts_n$ is the sampled arrival time of packet n. Hence $ts_n$ is the first arrival interval greater than or equal to $t_n$. The equation yields the average sub-frame offset between frame arrivals and depletions, for the system discussed with respect to FIG. 4. The average obtained from equation 2 compensates for the difference between sampled packet arrival times and depletion times ($ts_n - td_n$) resulting from channel jitter.

FIGS. 8A–8E are timing diagrams illustrating a method to correct for a non-zero frame phase offset using the system illustrated in FIG. 4, arrival data from FIG. 7 and letting N=4. A frame phase offset correction of two sub-frames is required. The depletion times are brought in sync with the packet arrival times. The resulting compensation (for frames with sequence numbers 2 and greater) is 60 ms, as desired.

It should be noted that the preferred embodiments relating to watermark optimization and frame phase offset adjustment address two different and independent phenomena. Another preferred embodiment includes a combination of the watermark optimization and frame phase offset to yield a jitter compensation that closely approximates the desired jitter compensation with an error on the order of a sub-frame duration. Increasing the value of k makes the resulting optimization process more precise. It should be noted that the adjustment due to the frame phase offset should be calculated before the watermark optimization otherwise the depletion time frame boundaries are biased and the actual jitter compensation will not necessarily match the required compensation.

Figure 9:
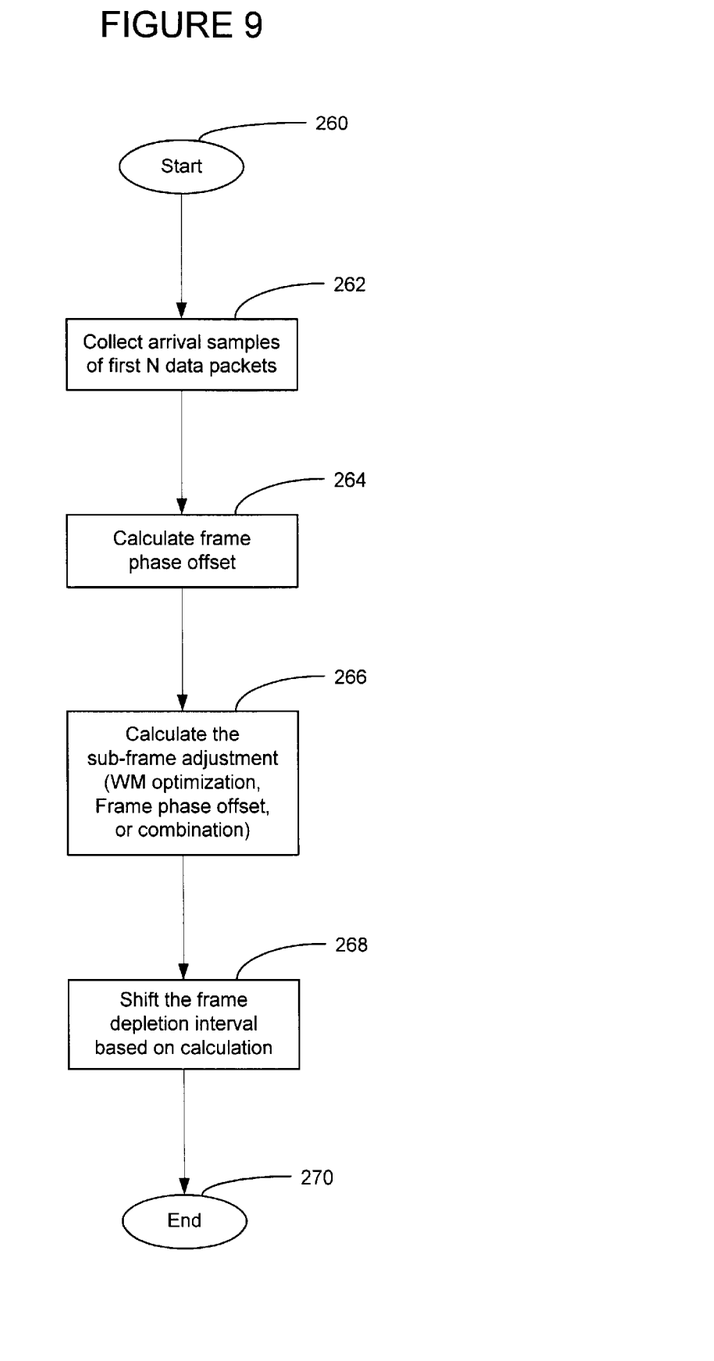
FIG. 9 is a flow chart illustrating an exemplary method that is executed in a preferred embodiment of a controller in accordance with the present invention.

FIG. 9 is an exemplary flowchart that illustrates the processing functions of the controller of the present invention that orders and determines timing of the play-out of the data packets from the jitter buffer. After entering the controller logic at step 260, N samples of data are collected in step 262. An average delay between the arrival and play-out times of the data packets are calculated as per step 264. The sub-frame adjustment is then calculated as in step 266 using either a watermark optimization computation, a frame phase offset computation or a combination of the two as discussed previously and described in further details hereinafter. Once the compensation is calculated, the sub-frames are shifted by the required amount per step 268 to provide an amount of jitter compensation which closely matches the desired amount. The method illustrated by FIG. 9 ends at step 270.

Figure 10:
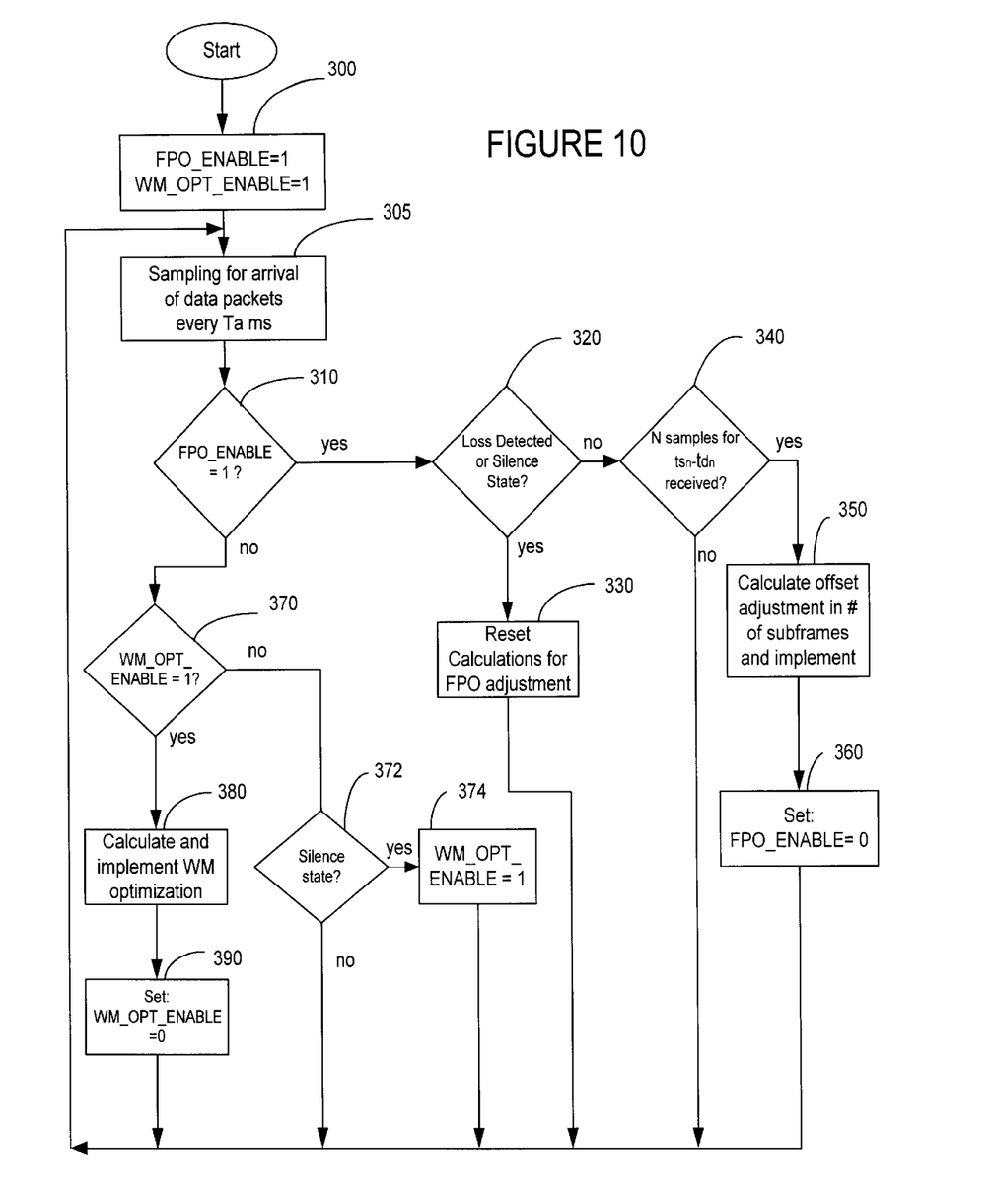
FIG. 10 is a flowchart illustrating a method for watermark optimization used with a frame phase offset adjustment in accordance with a preferred embodiment of the present invention.

FIG. 10 illustrates a flowchart defining the process to use both watermark optimization and frame phase offset adjustment. Per initialization step 300 the enable flag for frame phase offset calculation (FPO_ENABLE) is set to one and the enable flag for WM optimization (WM_OPT_ENABLE) is also set to one. Per step 305, sampling is performed for arrival of data packets every $T_a$ ms. When one or more frames arrive at the input of the jitter buffer, then it is determined if FPO_ENABLE is equal to 1, per step 310. If it is one, then a packet loss over the channel is detected by noticing a break in the sequence number stream or if the buffer is in a silence state, per step 320. If a packet loss is detected or the buffer is in silence state, then the frame phase offset adjustment calculations are reset, per step 330. Per step 340, it is then determined whether N samples have been received for the time difference between the sampled arrival and depletion sampling times ($ts_n$–$td_n$). If the required number of samples N have been received, then the frame phase offset adjustment in the number of sub-frames is calculated and implemented, per step 350. The frame phase offset flag is then reset, per step 360.

If the FPO_ENABLE is not equal to 1, then, per step 370, it is determined if WM_OPT_ENABLE is equal to 1. If yes, then, per step 380, the watermark optimization is calculated and implemented as previously described. Per step 390, WP_OPT_ENABLE is then set to a value of zero. If silence suppression is active, the jitter buffer will occasionally drain. When it re-fills, the frame phase offset adjustment is still correct, however the watermark needs to be re-optimized. Therefore, WM_OPT_ENABLE is set to one per step 374 whenever silence state is reached per step 372 due to silence suppression.

Figure 11:
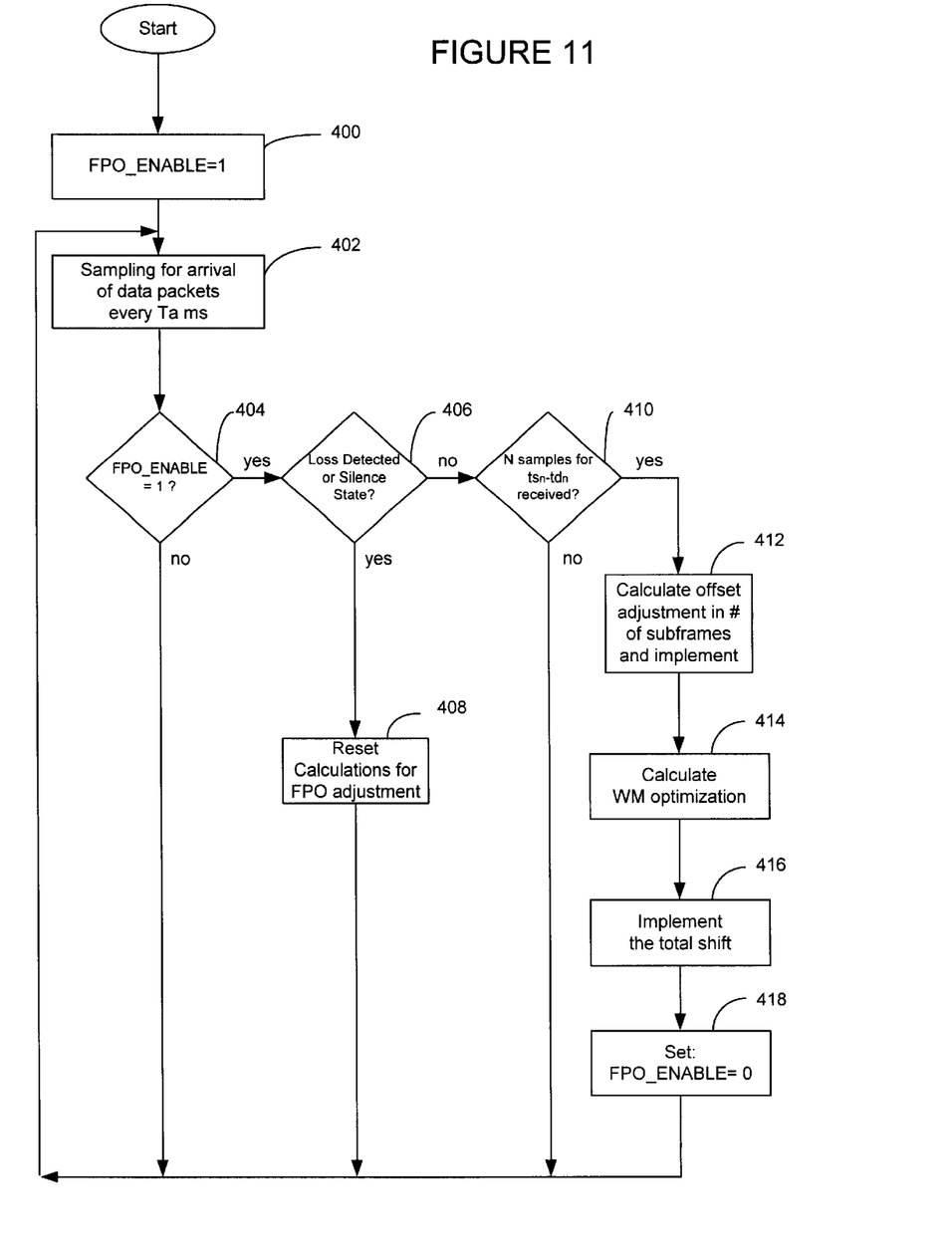
FIG. 11 is a flowchart illustrating another embodiment of a method for performing both a watermark optimization and a frame phase offset adjustment in accordance with the present invention.

It should be noted that by shifting the play-out of data packets by eliminating some fraction of a frame, audible clicks, pops and gaps in a voice conversation are caused, which degrades the quality of the conversation. It is therefore advantageous to implement one total shift in the play-out of data packets both for watermark optimization and frame phase offset, as shown in the flowchart of a preferred embodiment illustrated in FIG. 11. It is noted that steps 400, 402, 404, 406, 408, 410, 412 and 418 are analogous, respectively, with steps 300, 305, 310, 320, 330, 340, 350 and 360 as shown in FIG. 10. Thus, the calculation of the offset is similar to the process shown with respect to FIG. 10, however, the shift in the play-out is a total shift calculated and implemented as an aggregate of the WM optimization and frame phase offset per steps 414 and 416.

It should be understood that the programs, processes, methods and systems described herein are not related or limited to any particular type of computer or network system (hardware or software), unless indicated otherwise. Various types of general purpose or specialized computer systems may be used with or perform operations in accordance with the teachings described herein.

It should be readily apparent from the foregoing description and accompanying drawings that the calculations of the present invention for buffer performance may be used with other buffer systems not described herein.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the block diagrams. While various elements of the preferred embodiments have been described as being implemented in software, in other embodiments in hardware or firmware implementations may alternatively be used, and vice-versa.

The claims should not be read as limited to the described order or elements unless stated to that effect. Therefore, all embodiments that come within the scope and spirit of the following claims and equivalents thereto are claimed as the invention.

What is claimed is:

1. A method for transmitting real time communications including streams of data packets, each data packet having at least one frame, comprising:

receiving the data packets at a network;

de-packetizing the data packets at a de-packetizer;

buffering the data packets at a jitter buffer; and shifting the play-out of the data packets from the jitter buffer to a decoder by at least a fraction of a frame to provide a desired amount of jitter compensation, wherein the shift in the play-out of the data packets is computed by adjusting packet depletion times to align with average packet arrival times and sampling times of the arriving data packets are increased as compared to the packet depletion times.

2. A method for transmitting real time communications including streams of data packets, each data packet having at least one frame, comprising:

receiving the data packets at a network;

de-packetizing the data packets at a de-packetizer;

buffering the data packets at a jitter buffer; and shifting the play-out of the data packets from the jitter buffer to a decoder by at least a fraction of a frame to provide a desired amount of jitter compensation, wherein shifting the play-out of the data packets is computed by subtracting the product of an average number of frames in the buffer during a steady state and the frame duration from a desired compensation value and dividing the product by a sub-frame duration.

3. The method for transmitting real time communications of claim 2, wherein shifting the play-out of the data packets is computed by the equation $$\lfloor [\text{desired compensation} - (WM \times T_d)] \div T_a \rfloor$$

wherein

WM is a watermark value that is defined by an average number of frames in the jitter buffer;

$T_d$ is the frame duration; and $T_a$ is a sub-frame duration.

4. A method for transmitting real time communications including streams of data packets, each data packet having at least one frame, comprising receiving the data packets at a network;

de-packetizing the data packets at a de-packetizer;

buffering the data packets at a jitter buffer; and shifting the play-out of the data packets from the jitter buffer to a decoder by at least a fraction of a frame to provide a desired amount of jitter compensation, wherein shifting the play-out of the data packets is computed by taking the average of the difference between packet arrival times and depletion times and shifting the play-out of the data packets is computed by the equation $$\left\lfloor \frac{1}{N \cdot T_a} \cdot \sum_{n=0}^{N-1} (ts_n - td_n) \right\rfloor$$

wherein N is a sample size of data packets;

$T_a$ is the sub-frame interval, $ts_n$ is the sampled packet arrival time; and $td_n$ is the packet depletion time.

5. A method for transmitting real time communications including streams of data packets, each data packet having at least one frame, comprising:

receiving the data packets at a network;

de-packetizing the data packets at a de-packetizer;

buffering the data packets at a jitter buffer;

shifting the play-out of the data packets from the jitter buffer to a decoder by at least a fraction of a frame to provide a desired amount of jitter compensation; and adding a shift in the play-out of the data packets which is computed by subtracting the product of an average number of frames in the jitter buffer during a steady state and the frame duration from a desired compensation value and dividing the product by a sub-frame duration, wherein shifting the play-out of the data packets is computed by taking the average of the difference between packet arrival times and depletion times.

6. A method for transmitting real time communications including streams of data packets, each data packet having at least one frame, comprising:

receiving the data packets at a network;

de-packetizing the data packets at a de-packetizer;

buffering the data packets at a jitter buffer; and shifting the play-out of the data packets from the jitter buffer to a decoder by at least a fraction of a frame to provide a desired amount of jitter compensation, wherein shifting the play-out of the data packets is computed by combining the shift calculated by taking the average of the difference between packet arrival times and depletion times and the shift calculated by subtracting the product of an average number of frames in the jitter buffer during a steady state and a frame duration from a desired compensation value and dividing the product by a sub-frame duration.

7. A communication system receiver for real time communication including a plurality of data packets, each data packet having at least one frame, comprising a data network to provide data connectivity for a plurality of data communication channels using data transport protocols;

a de-packetizer for de-packetizing the data packets;

a jitter buffer for storing data packets, the jitter buffer shifting the play-out of the data packets to a decoder by at least a fraction of a frame to provide a desired amount of jitter compensation; and a first clock having a first rate that defines packet arrival times and a second clock having a second rate that defines frame depletion times, wherein the first rate is k times faster than the second rate.

8. A control system for a jitter buffer in a communication system receiver for real time communication of a plurality of data packets, comprising a jitter buffer to store the data packets; and a controller to process the order and the timing of the play-out of the data packets from the jitter buffer such that a desired jitter compensation is provided, wherein the controller comprises a first clock having a first rate that defines packet arrival sampling times and a second clock having a second rate that defines frame depletion times wherein the first rate is k times faster than the second rate.

* * * * *